United States Patent [19]

Indyk

[11] Patent Number: 5,538,148
[45] Date of Patent: Jul. 23, 1996

[54] CARGO SUPPORT FOR VEHICLES

[76] Inventor: Gary Indyk, 62 Birch Rd., Franklin Lakes, N.J. 07417

[21] Appl. No.: 194,906

[22] Filed: Feb. 14, 1994

[51] Int. Cl.⁶ .................................................. A47F 5/00
[52] U.S. Cl. .............................................. 211/195; 211/73
[58] Field of Search .................................... 211/195, 184, 211/73, 85; 248/174; 229/120.31

[56] References Cited

U.S. PATENT DOCUMENTS

| | | | |
|---|---|---|---|
| 2,671,584 | 3/1954 | Taylor, Jr. | 211/73 X |
| 4,189,056 | 2/1980 | Majewski | 211/195 |
| 4,540,213 | 9/1985 | Herlitz et al. | 211/195 X |
| 4,949,851 | 8/1990 | Shaffer | 211/195 X |
| 5,161,700 | 11/1992 | Stannis et al. | 211/184 X |
| 5,269,447 | 12/1993 | Gower et al. | 211/184 X |

Primary Examiner—Ramon O. Ramirez
Assistant Examiner—Sarah L. Purol
Attorney, Agent, or Firm—Richard A. Joel

[57] ABSTRACT

A cargo support for vehicles comprises a pair of spaced end panels with transversely extending rib panels which are positioned at predetermined intervals to form cargo bays. The transverse ribs include a creased center fold and are hinged at their ends to the panels. The ribs include a central cut-out for ease of folding, tabs which connect at each end to the end panels and lower outrigger portions for support purposes which extend through apertures in the end panels. Once the ribs are assembled to the panels, the cargo support may be collapsed in an accordion fashion for storage purposes. The cargo support is inexpensive, easy to assemble and may be readily used in an automobile trunk, cargo area or on the rear seat.

8 Claims, 4 Drawing Sheets

CARGO SUPPORT FOR VEHICLES

BACKGROUND OF THE INVENTION

The cargo support of the present invention comprises an arrangement for supporting bags, groceries or other items in compartments separated by transverse collapsible rib panels. The support prevents the bags and other groceries from shifting, falling or moving around in the trunk. This prevents spilling of bags and/or various groceries and bottles breaking. The device may be stored in a collapsed condition and opened within a manner of seconds and positioned to support groceries or other cargo. Among the closer prior art references are the patents listed below:

U.S. Pat. No. 4,884,733 to Geeyes, discloses a storage container for use in the trunk of a vehicle. The patent includes a rectangular open top box with plastic sheet dividing members.

U.S. Pat. No. 5,054,668 to Ricchiuti discloses a carrier tray having a plurality of compartments some of which are adjustable in size by the use of inclined insertable slats.

U.S. Pat. No. 5,161,700 to Stannis discloses an adjustable storage system for groceries which includes a flat base and an upstanding thick side attached to the base and adjustable slidable sides which slide on the base and cooperate with the fixed side to provide support and containment for packages.

U.S. Pat. No. 4,540,213 to Herlitz and U.S. Pat. No. 4,718,584 to Schoney are also of interest.

None of the foregoing patents disclose the structure of the present invention or have the distinct advantages inherent in the invention.

SUMMARY OF THE INVENTION

This invention relates to support devices for vehicles particularly to a cargo support device for use in the trunk or back seat of an automobile. The invention is readily assembled and once assembled may be collapsed into a configuration which permits ready storage in the automobile. The device is inexpensive and quite useful.

The cargo support comprises a pair of rigid end panels and a plurality of transverse ribs which are hinged to the panels at their internal walls. The support is made of 200 pound test corrugated board and the ribs include a central crease and a curved cut-out so that the device is readily foldable along the central crease and can flex to support cargo of varying sizes and shapes. Each end panel includes a cut-out so that a protruding outrigger portion of the rib may swivel within such cut-out when the support is collapsed. The panels also include internal slots wherein tabs on the ribs are slid into and engaged with said panel and are foldable at such coupling.

The ribs also include end flanges or outrigger portions which help support the arrangement in the automobile. The end panels and rib panels each comprise a folded over assembly which is adhered together in a predetermined configuration.

Accordingly, it is an object of this invention to provide a new and improved cargo support arrangement for vehicles.

Another object of this invention is to provide a new and improved cargo support for automobiles which is lightweight, inexpensive and collapsible for purposes of storage.

A more specific object of this invention is to provide a cargo support for automobiles which includes a pair of end panels and foldable transverse ribs which serve to separate groceries or grocery bags within the support arrangement in separate cargo bays, said ribs being foldable at their center to collapse the support for storage purposes.

BRIEF DESCRIPTION OF THE DRAWINGS

The above and other objects and advantages of this invention may be more clearly seen when viewed in conjunction with the accompanying drawings wherein.

DETAILED DESCRIPTION OF THE INVENTION

Figure 1:
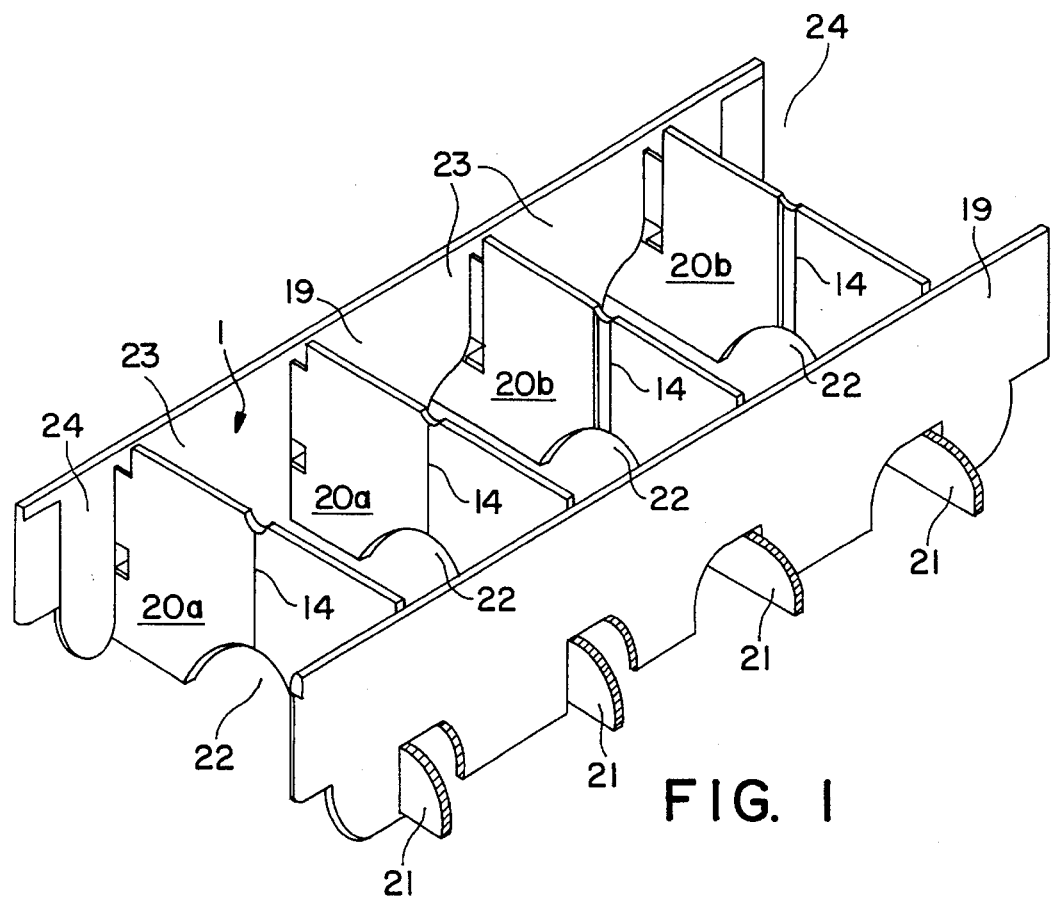
FIG. 1 is a perspective view of the invention in an assembled condition.

Referring now to the drawings, the invention as shown in FIG. 1 comprises a vehicle cargo support 1 in an open or expanded condition. The support 1 comprises a pair of spaced side frame panels 19 separated by a plurality of transverse divider panels or ribs 20a and 20b. The panels 20a and 20b include outrigger portions 21 which extend through apertures 24 in the side panels 19 to provide further lateral support on a floor 3 or rear seat 7. The panels 20a and 20b also include a semi-circular cut-out 22 to aid folding and to permit positioning of the unit 1 on uneven floor or seat surfaces. Flexibility in panels 20a and 20b at hinge line 14 allows the shape of the cargo bays 23 to vary to accommodate non-uniform shaped cargo items.

Typically, the cargo bays 23 are 8½ inches wide by 13½ inches long by 8 inches deep. While 3 bays 23 are shown in FIG. 1, one or more bays 23 may be formed by varying the number of panels 20a and 20b. Areas 23a comprise the end channel bays formed by extensions of the end panels 19. The are useful to stow cargo if the end of the vehicle cargo support 1 is positioned against an automobile door, seat or other automobile surface. The overall dimensions of the fully expanded vehicle cargo support shown in the embodiment of FIG. 1 are approximately 36 inches long by 19 inches wide by 8 inches high. This size will fit into the cargo area, rear seat or trunk of virtually any passenger automobile currently on the market.

Figure 2:
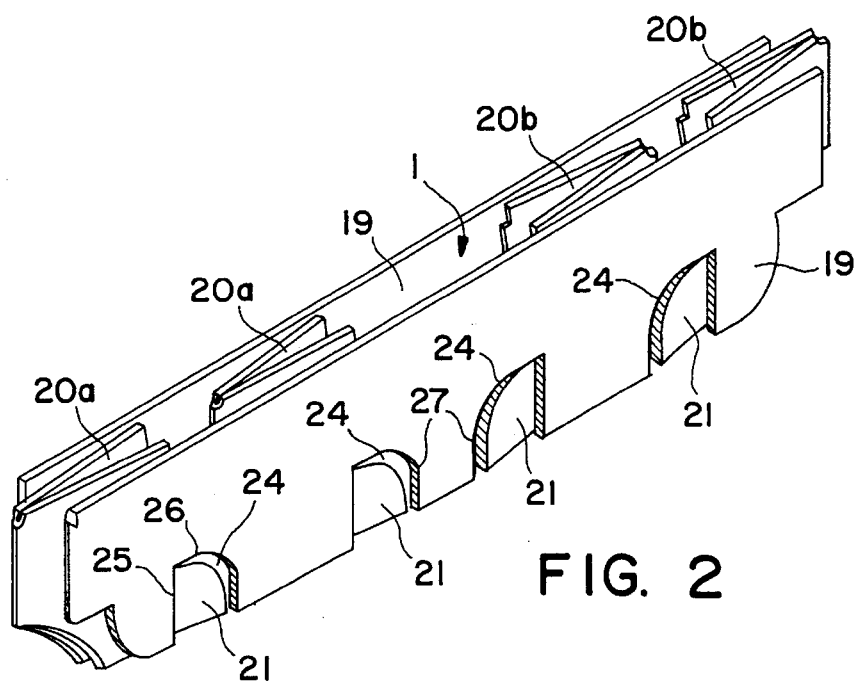
FIG. 2 is a perspective view of the invention in a folded position for storage.

FIG. 2 shows the cargo support 1 in a folded position for storage. Panels 20a fold in one direction along the crease line 14 while panels 20b fold along the crease line 14 in the opposite direction. Panels 19 are folded towards each other while outriggers 21 fold into shaped openings 24 in the panels 19. The openings 24 comprise a vertically extending wall 25, an upper perpendicular section 26 and a downwardly curving section 27 to accommodate the outriggers 21.

The folded cargo support 1 may be easily stored on board a vehicle or in another remote location. The approximate dimensions of the folded cargo vehicle support 1 are 38 inches long by 8 inches wide by 1¾ inches thick. Thus, with its light weight and compact size, the cargo support is easy and convenient to use.

Figure 3A:
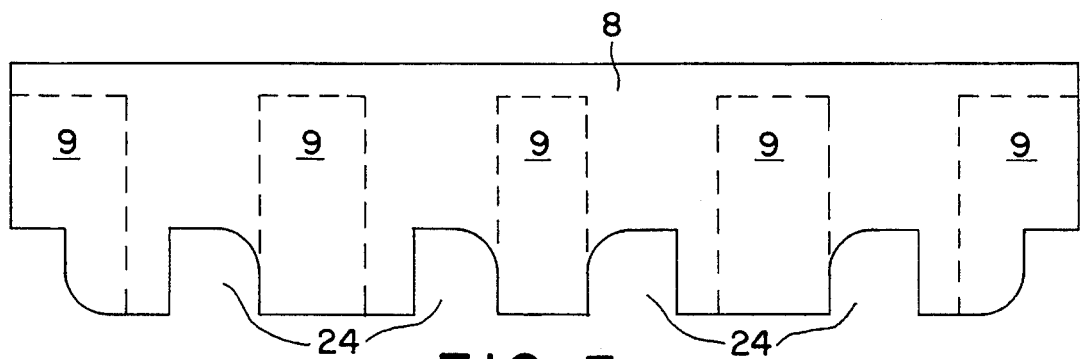
FIG. 3a and 3b disclosed front and rear elevational views of the side panels.
Figure 3B:
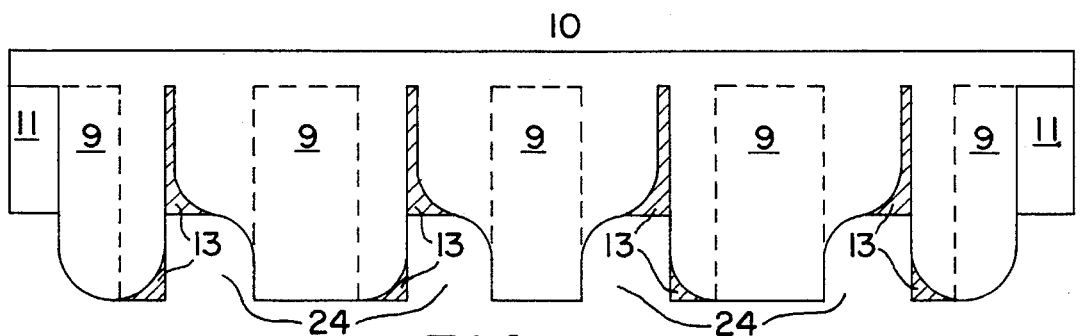

FIGS. 3a and 3b show elevational views of the side frame components 19 of the vehicle cargo support 1. Panel 8 is the front side of a rigid corrugated board approximately ⅛ inch thick with outrigger apertures 24 clearly shown. Interior spacer elements 9 are shown in phantom affixed to the panel 8. The spacer elements 9 are of rigid corrugated board approximately ⅛ inch thick.

Panel 10 is the rear side of a corrugated board approximately ⅛ inch thick which is affixed to the other side of the spacer elements 9. Tabs 11 are extensions of panel 8 folded around the interior spacers 9 and adhered with their surface in alignment with panel 10. The complete assembly of a side frame panel 19 comprises panel 8, spacer element 9 and panel 10 having overall dimensions of 36×8×⅜ inches. Panels 8 and 10 are separated by the interior spacers 9. This provides a ⅛ inch space or slot between panel 8 and panel 10 in areas not occupied by the spacer elements 9. Areas 13 are the rear of panel 8 not covered by panel 10.

Figure 4A:
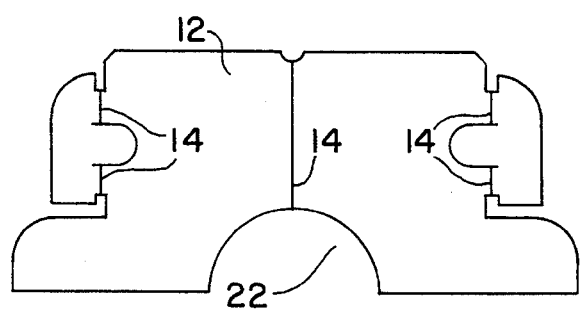
FIG. 4a and 4b shows a front and rear elevational views of the interior foldable panels.
Figure 4B:
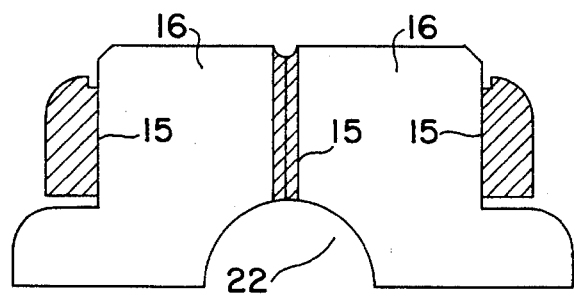

FIGS. 4a and 4b show elevational views of the interior divider components of panel 20a and 20b. Panel 12 is the front side of a rigid corrugated board approximately ⅛ inch thick having a central crease 14 and cut-out 22. Additional creases 14 are provided at each end to serve as a hinge or flexible joint.

Panel 16 is the rear side of a rigid corrugated board approximately ⅛ inch thick which is affixed to panel 12. The complete assembly comprises two layers of rigid corrugated board with each being approximately ⅛ inch thick. The complete assembly comprises two layers of rigid corrugated board approximately 19 inches long by 8 inches high by ¼ inches thick. Areas 15 are the rear of panel 12 not covered by panel 16.

Figure 5:
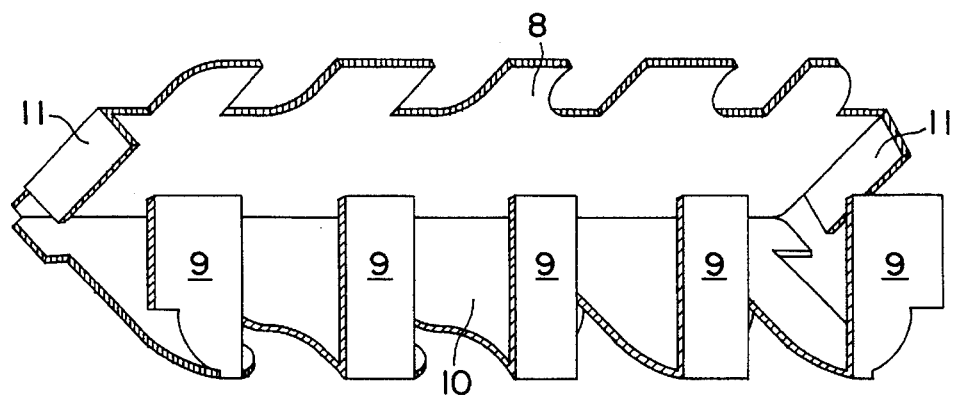
FIG. 5 discloses the formation of a side panel self assembly.
Figure 6:
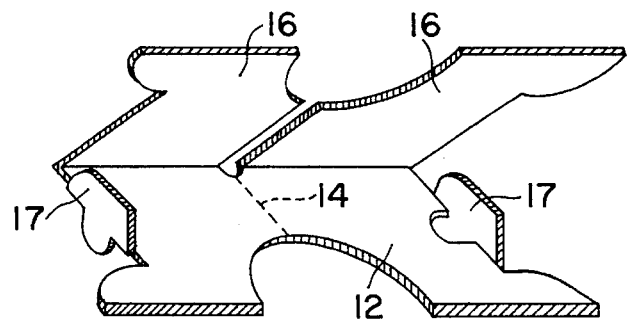
FIG. 6 discloses formation of a rib panel assembly.

FIGS. 5 and 6 show the side panels 19 and transverse panels 20a and 20b prior to assembly. Rectangular spacers 9 and end spacers 9 are folded over against panel 10 while flange elements 11 are similarly folded over with the panels 8 and 10 being affixed to opposite sides of the spacer elements 9. Tabs 11 are folded around interior spacers and adhered to the rear surface of spacers 9 in alignment with panel 10.

In FIG. 6, panel 16 is adhered to panel 12. Tabs 17 are folded into position perpendicular to panel 12 while panel 12 is creased at 14 to provide a hinge or flexible joint.

Figure 7:
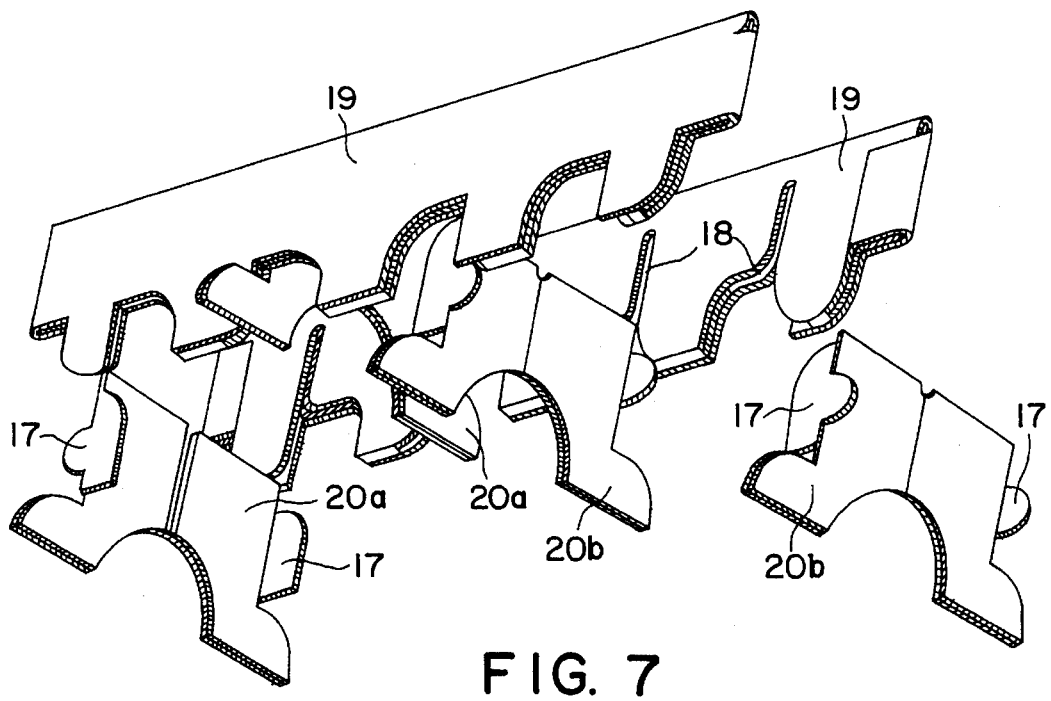
FIG. 7 shows the final assembly of the transverse rib panels and end panels to form the cargo support.

FIG. 7 shows the end panels 19 and the transverse panels or ribs 20a and 20b being assembled together to form the cargo support 1. Tabs 17 on panels 20a and 20b are aligned with slots 18 in panels 19 and the respective panels brought together so that the tabs 17 are inserted into the slots 18. Reversing the process, disassembles the cargo support 1.

Figure 8:
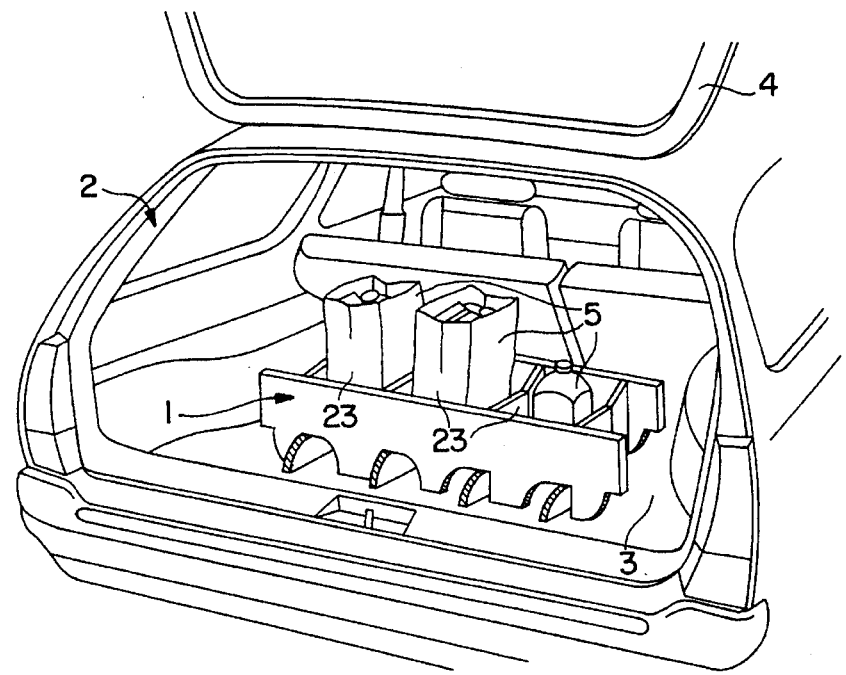
FIG. 8 discloses the use of the cargo support in an automobile cargo area.

FIG. 8 is a partial perspective view of a station wagon or hatchback style automobile 2 with rear liftgate or door 4 open. The vehicle cargo support is shown on the floor 3 with typical cargo 5 in the bays 23. The support 1 can handle bags of groceries or irregularly shaped products in the various flexible bays 23.

Figure 9:
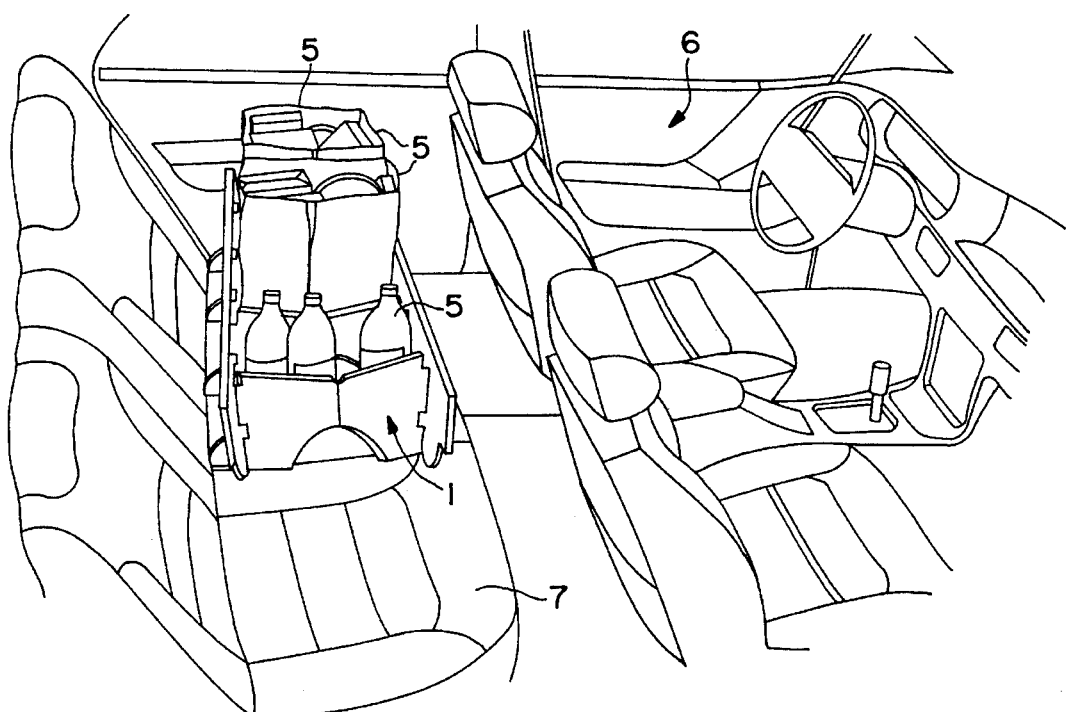
FIG. 9 shows the use of the cargo support on the rear seat of an automobile.

FIG. 9 is a partial perspective view of an automobile interior 6. The cargo support 1 is shown on the rear seat 7 with typical cargo 5 in the bays 23.

While the invention has been explained by a detailed description of certain specific embodiments, it is understood that various modifications and substitutions can be made in any of them within the scope of the appended claims which are intended also to include equivalents of such embodiments.

What is claimed is:

1. A collapsible cargo support for vehicles made of corrugated board comprising:

a pair of juxtaposed end panels each having a plurality of similar spaced cut-outs along the lower surface thereof and an internal slot extending upwardly within the end panel along one edge of the cut-out, and, a plurality of transverse rib panels each having a tab at their upper end portions to engage a corresponding slot in the end panel and a lower outwardly extending outrigger portion at each end which extends through a corresponding end panel cut-out in an assembled condition and swivels back within the cutout in a collapsible condition, said rib panels also including a central vertical crease and central semi-circular cut-out to facilitate folding of the rib panel to collapse the cargo support.

2. A collapsible cargo support in accordance with claim 1 wherein:

each end panel comprises a front portion having an edge including a plurality of spaced cut-outs and outwardly extending tabs at each end, a central fold in the rib panel and a rear portion forming the side of the fold opposite the front portion, said rear portion having an edge including a plurality of spaced cut-outs corresponding to the cut-outs in the front portion and a plurality of outwardly extending spacer elements, said elements being foldable between the front and rear portions and being bonded thereto and said tabs being foldable and bonded to the spacer elements.

3. A collapsible cargo support in accordance with claim 2 wherein:

each rib panel comprises a front portion, a rear portion and a central fold between said portions which divides the portions into corresponding shapes, said front portion having vertical slot and the rear portion having a crease adjacent the slot for purposes of folding said rib panel, said front and rear portions being bonded to each other.

4. A collapsible cargo support in accordance with claim 1 wherein:

the plurality of rib panels comprises four (4) rib panels, two of said adjacent rib panels at one end having a crease facing towards the outer end of the end panels and the other two rib panels having a crease facing towards the other end of the end panels, said rib panel folding in the direction of the crease when the cargo support is collapsed.

5. A collapsible cargo support in accordance with claim 1 further including:

a plurality of cargo bays formed by adjacent rib panels, said cargo bays being flexible to accommodate cargo with the foldable panels.

6. A collapsible cargo support in accordance with claim 1 wherein:

the end panels extend outwardly beyond the rib panels at each end to accommodate cargo therebetween.

7. A collapsible cargo support in accordance with claim 1 wherein:

the end panels include a lower edge and the cut-outs in the end panels extend vertically from said edge to a perpendicular upper portion curving downwardly to the edge a predetermined distance therefrom,, said cut-outs configurations being reversed for ribs which fold in the opposite direction.

8. A collapsible cargo support in accordance with claim 1 wherein:

each rib panel includes a lower support edge having a central semi-circular cut-out to facilitate folding of the ribs.

* * * * *